(12) United States Patent
Malyarov et al.

(10) Patent No.: US 11,280,804 B2
(45) Date of Patent: Mar. 22, 2022

(54) PUCK TOP TUBE CARRIER CONSTRUCTION

(71) Applicant: Siemens Healthcare Diagnostics Inc., Tarrytown, NY (US)

(72) Inventors: Ilya Malyarov, Livingston, NJ (US); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 323 days.

(21) Appl. No.: 16/319,252

(22) PCT Filed: Jul. 19, 2017

(86) PCT No.: PCT/US2017/042918
§ 371 (c)(1),
(2) Date: Jan. 18, 2019

(87) PCT Pub. No.: WO2018/017753
PCT Pub. Date: Jan. 25, 2018

(65) Prior Publication Data
US 2019/0242919 A1   Aug. 8, 2019

Related U.S. Application Data

(60) Provisional application No. 62/365,250, filed on Jul. 21, 2016.

(51) Int. Cl.
| | | |
|---|---|---|
| *G01N 35/00* | (2006.01) | |
| *G01N 35/04* | (2006.01) | |
| *B01L 9/06* | (2006.01) | |
| *G01N 35/02* | (2006.01) | |

(52) U.S. Cl.
CPC .......... *G01N 35/00732* (2013.01); *B01L 9/06* (2013.01); *G01N 35/02* (2013.01);
(Continued)

(58) Field of Classification Search
CPC .. G01N 35/00732; G01N 35/02; G01N 35/04; G01N 2035/00752;
(Continued)

(56) References Cited

U.S. PATENT DOCUMENTS 5,137,693 A * 8/1992 Mawhirt ................ B01L 9/06
                                                      206/446
5,651,941 A    7/1997  Stark et al.
(Continued)

FOREIGN PATENT DOCUMENTS

EP     0 919 281 A2    6/1999
JP     H06-510233 A   11/1994
(Continued)

OTHER PUBLICATIONS

Extended EP Search Report dated Jul. 4, 2019 of corresponding European Application No. 17831819.2, 4 Pages.
(Continued)

*Primary Examiner* — Jill A Warden
*Assistant Examiner* — John McGuirk (57) ABSTRACT

Embodiments are directed to a carrier configured to hold and transport a vessel with a barcode label in an automation system in in vitro diagnostics (IVD) environment, with a plurality of peripheral readers able to read the barcode label. The reading of the barcode label on the vessel loaded into the carrier is achieved without the need to align (either manually or automatically) the barcode to the peripheral readers. A dual spring arrangement provides for consistent vessel capture when loading the vessel into the carrier and for retention in the carrier during transport operations. A centrally-located spring housing provides efficient space utilization. A mirrored dual slot design is provided so that an unobstructed space for each slot is complimentary such that a completely unobstructed view of the vessel is constructed (Continued)

by imaging the same vessel in both slots (one after another) and fusing the resulting data.

19 Claims, 10 Drawing Sheets

(52) U.S. Cl.
CPC ... *G01N 35/04* (2013.01); *G01N 2035/00752* (2013.01); *G01N 2035/0406* (2013.01)

(58) Field of Classification Search
CPC ............... G01N 2035/0406; B01L 9/06; B01L 2200/0025; B01L 2300/0609; B65G 2201/0261
See application file for complete search history.

(56) References Cited

U.S. PATENT DOCUMENTS

| | | | | |
|---|---|---|---|---|
| 5,861,563 | A * | 1/1999 | Boyd | B01L 9/06 366/140 |
| 5,985,219 | A * | 11/1999 | Lind | B01L 9/06 422/562 |
| 2004/0124109 | A1 | 7/2004 | Hassinen et al. | |
| 2011/0182784 | A1 * | 7/2011 | Suzuki | B01L 9/06 422/561 |
| 2013/0066562 | A1 | 3/2013 | Hengstler et al. | |
| 2014/0326082 | A1 * | 11/2014 | Hirama | G01N 35/04 73/863.92 |
| 2014/0374480 | A1 | 12/2014 | Pollack | |
| 2016/0025756 | A1 | 1/2016 | Pollack et al. | |

FOREIGN PATENT DOCUMENTS

| | | |
|---|---|---|
| JP | H11-230969 A | 8/1999 |
| JP | 2015-516075 A | 6/2015 |
| JP | 2017-513696 A | 6/2017 |
| WO | 2013/099647 A1 | 7/2013 |

OTHER PUBLICATIONS

PCT International Search Report and Written Opinion dated Oct. 2, 2017 (8 Pages).

* cited by examiner

PUCK TOP TUBE CARRIER CONSTRUCTION

CROSS-REFERENCE TO RELATED APPLICATION

This application claims priority to U.S. Provisional Patent Application No. 62/365,250 filed on Jul. 21, 2016, the contents of which are hereby incorporated by reference in its entirety.

TECHNOLOGY FIELD

The present invention relates generally to an automation system for use in a laboratory environment and more particularly to a carrier for a vessel containing a sample for use in an in vitro diagnostics environment.

BACKGROUND

In vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers (analyzers) onto which fluid containers, such as tubes or vials containing patient samples, have been loaded. The analyzer extracts a liquid sample from sample vessels and combines the sample with various reagents in special reaction cuvettes or tubes (referred to generally as reaction vessels). In some conventional systems, a modular approach is used for analyzers. A lab automation system can shuttle samples between one sample processing module (module) and another module. Modules may include one or more stations, including sample handling stations and testing stations (e.g., a unit that can specialize in certain types of assays or can otherwise provide testing services to a larger analyzer, which may include immunoassay (IA) and clinical chemistry (CC) stations).

An automation system for use with analyzers in an IVD environment moves tubes or vessels containing sample specimens between different stations within an analyzer or between analyzers. One common way to move these samples is by using carriers, such as pucks, along a track. Typically, the tubes or vessels containing samples contain a barcode label on an outer portion thereof for identifying the respective samples. One or more barcode readers and/or cameras are positioned at or near one or more portions of the track to identify the sample loaded on or being loaded onto a carrier.

Thus, there is a need to be able to efficiently and reliably read the barcode label of a vessel as it is loaded into the carrier, and there is a need to safely receive the vessel at the time of loading and to securely retain the vessel during its transport on the track.

SUMMARY

Embodiments are directed to a carrier configured to hold and transport a vessel in an automation system in, for example, a clinical analyzer in an in vitro diagnostics environment. According to embodiments provided herein, the carrier is configured so that a plurality of peripheral readers are able to read the barcode label contained on the vessel without the need to align the barcode to the reader.

In an embodiment, a carrier configured to hold and transport a vessel containing a barcode label comprises: a body comprising a top surface; two sets of a plurality of vertically-extending vessel guides on the top surface of the body, each of the two sets of the plurality of vertically-extending vessel guides arranged in a circumferential orientation defining an opening sized and shaped to contain a vessel in the opening; and a spring assembly on the top surface of the body comprising a central member that supports two sets of springs, wherein a respective one of the two sets of springs provides support to the vessel contained in a respective one of the two openings to hold the vessel in the respective opening. The two sets of the plurality of vertically-extending vessel guides and the spring assembly are arranged in a lateral configuration with the spring assembly positioned between the two sets, and the two sets are a mirrored-configuration with respect to one another such that substantially all of an outer surface of the vessel is unobscured when the vessel is contained in, one at a time, each of the two openings.

In an embodiment, each of the two sets of springs of the spring assembly comprises a dual spring arrangement comprising an upper spring and a lower spring. In an embodiment, the upper spring is thicker than the lower spring and is configured to deliver a main preload to the vessel. In an embodiment, the lower spring produces a smaller force for a first vessel with a diameter smaller than a second vessel, wherein the lower spring produces a higher force for the second vessel. In an embodiment, the carrier further comprises a spring shield configured to protect the lower spring from external forces.

According to an embodiment, the carrier further comprises two sets of base guides on the top surface of the body, a respective base guide defining a portion of a circumference of a respective opening and integral with a bottom portion of a respective set of the plurality of vertically-extending vessel guides.

In an embodiment, in each of the two sets of a plurality of vertically-extending vessel guides, one or more of the plurality of vertically-extending vessel guides differs in height from others of the plurality of vertically-extending vessel guides.

In an embodiment, an automation system for use in an in vitro diagnostics (IVD) environment comprises a carrier configured to hold and transport a vessel containing a barcode label, the carrier comprising: a body comprising a top surface; two sets of a plurality of vertically-extending vessel guides on the top surface of the body, each of the two sets of the plurality of vertically-extending vessel guides arranged in a circumferential orientation defining an opening sized and shaped to contain a vessel in the opening; and a spring assembly on the top surface of the body comprising a central member that supports two sets of springs, wherein a respective one of the two sets of springs provides support to the vessel contained in a respective one of the two openings to hold the vessel in the respective opening. The two sets of the plurality of vertically-extending vessel guides and the spring assembly are arranged in a lateral configuration with the spring assembly positioned between the two sets, and the two sets are a mirrored-configuration with respect to one another such that substantially all of an outer surface of the vessel is unobscured when the vessel is contained in, one at a time, each of the two openings. The automation system further comprises a track comprising a surface on which the carrier is held and moves; a plurality of peripheral readers arranged proximate the track at a loading point of the vessel in the carrier, the plurality of peripheral readers configured to read the barcode label on the vessel in the carrier; and a processor coupled to and in communication with the plurality of peripheral readers, the processor configured to receive and process signals related to the read barcode label on the vessel in the carrier.

In an embodiment, the two sets of the plurality of vertically-extending vessel guides and the spring assembly are aligned with a line of sight of the plurality of peripheral readers.

In an embodiment, an unobstructed space for each opening is complementary such that an unobstructed view of the vessel is constructed by imaging the vessel in both openings by the plurality of peripheral readers and fusing resulting data by the processor.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Embodiments are directed to a carrier configured to hold and transport a vessel in, for example, an automation system an in vitro diagnostics (IVD) environment. In an embodiment, the vessel contains a barcode label and the automation system comprises a plurality of peripheral readers able to read the barcode label. According to embodiments provided herein, the reading of the barcode label on the vessel loaded into the carrier is achieved without the need to align (either manually or automatically) the barcode to the peripheral readers. Moreover, the handling of vessels of approved dimensions and characteristics by the carrier is done in a consistent and reliable manner throughout vessel capture and vessel retention processes.

Although embodiments are described with respect to an automation system comprising a track for use in IVD environments, the invention is not so limited. The apparatus, systems, and methods provided herein may be extended by one of ordinary skill in the art to other environments and uses.

Figure 1:
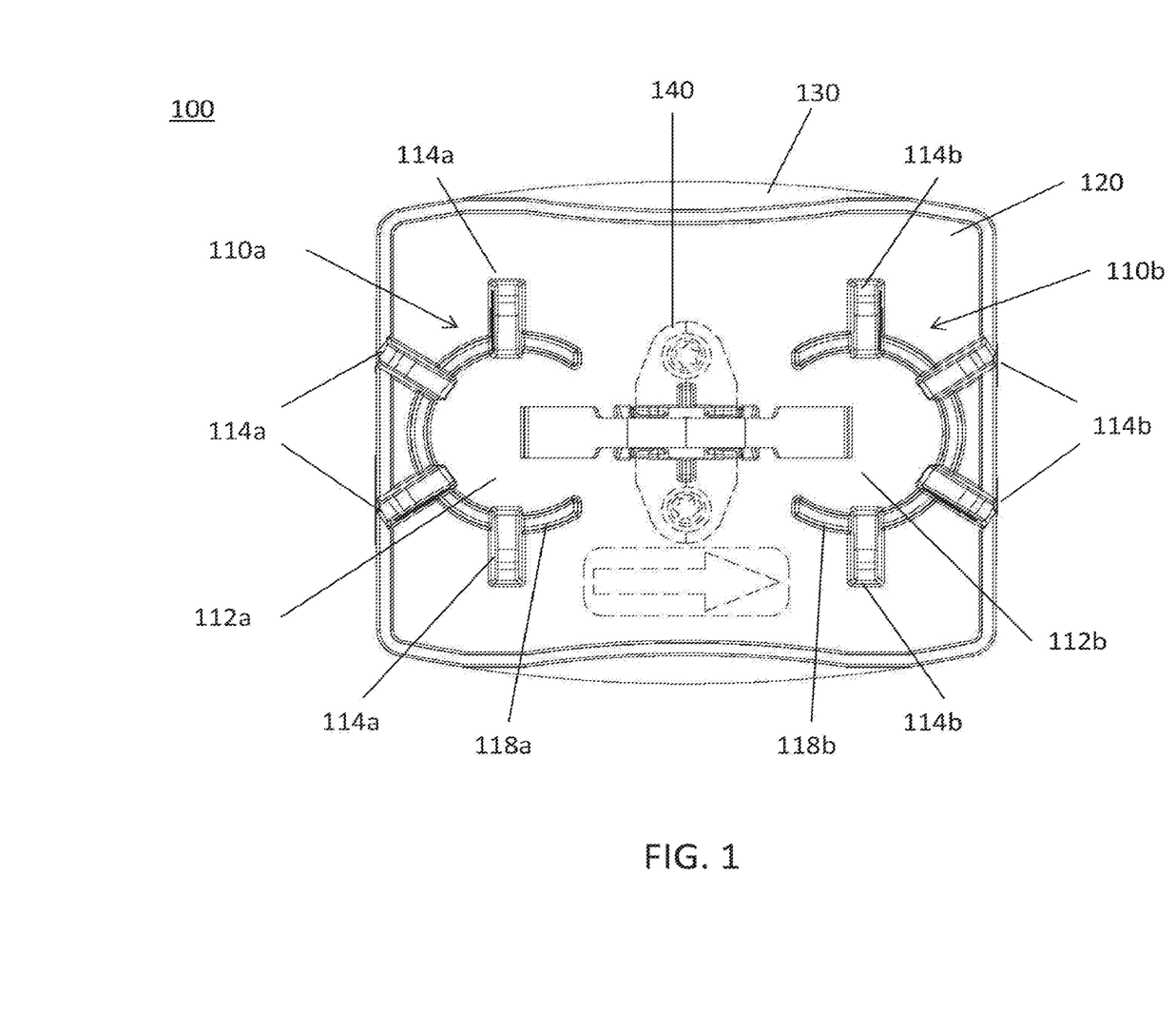
FIG. 1 is a top-down diagram depicting features of a carrier configured to hold and transport a vessel in an automation system, according to an embodiment.

FIG. 1 is a top-down diagram depicting features of a carrier 100 configured to hold and transport a vessel in an automation system, according to an embodiment. Carrier 100 is configured to support place and pick movement of vessels into and out of the carrier 100. As shown in FIG. 1, the carrier 100 is comprised of a body 130 with a top surface 120. Two slots, 110a and 110b, are positioned on the top surface 120. Left-hand slot 110a (as oriented in FIG. 1) is configured to receive a vessel in opening 112a, with the vessel placed between a set of tines 114a. Similarly, right-hand slot 110b is configured to receive a vessel in opening 112b, with the vessel placed between a set of tines 114b. Although the embodiment shown in FIG. 1 has each slot 110a and 110b including four tines, or vertically-extending vessel guides, 114a and 114b positioned around a circumference defining respective openings 112a and 112b, there may be fewer or additional tines 114 for each slot 110. The tines 114 assist in capturing the vessel and accurately positioning the vessel once loaded into a respective slot 110.

In an embodiment, one or more of the slots 110a and 110b comprise a base guide 118a and 118b. The base guides 118a, 118b extend around a portion (in some embodiments, a majority portion) of the circumference of respective openings 112a, 112b at the top surface 120 of the carrier 100. The base guides 118a, 118b provide additional support for and positioning of a vessel contained within the opening 112a, 112b of the slot 110a, 110b. The base guides 118a, 118b may be integral with the tines 114a, 114b at bottom portions of the tines 114a, 114b. In an alternative embodiment, the base guides 118a, 118b may be separate from the tines 114a, 114b.

As shown in FIG. 1, the slots 110a and 110b are symmetric and mirrors of each other. Between the slots 110a, 110b, a dual spring arrangement or a spring assembly 140 acts as a tine that provides flexible support to the vessel contained in the slots 110a, 110b. The spring assembly 140 provides for consistent vessel capture when loading the vessel into the carrier 100 and for retention in the carrier 100 during transport operations. The centrally-located spring assembly 140 provides efficient space utilization.

The right-most and left-most pair (in the orientation of FIG. 1) of tines 114 act to register and center a vessel forced by the spring assembly 140. Meanwhile the upper-most and lower-most pairs of tines 114 provide additional security to prevent a vessel from tipping over the lateral direction. As can be seen, there are several openings between the tines 114 and the spring assembly 140. This allows various optical views of the vessel, as described in detail below. When the carrier 100 is placed in an automation system, multiple camera views are accessible through the spaces between the tines 114 to read barcode labels or sense the liquid height in the vessel.

Figure 2A:
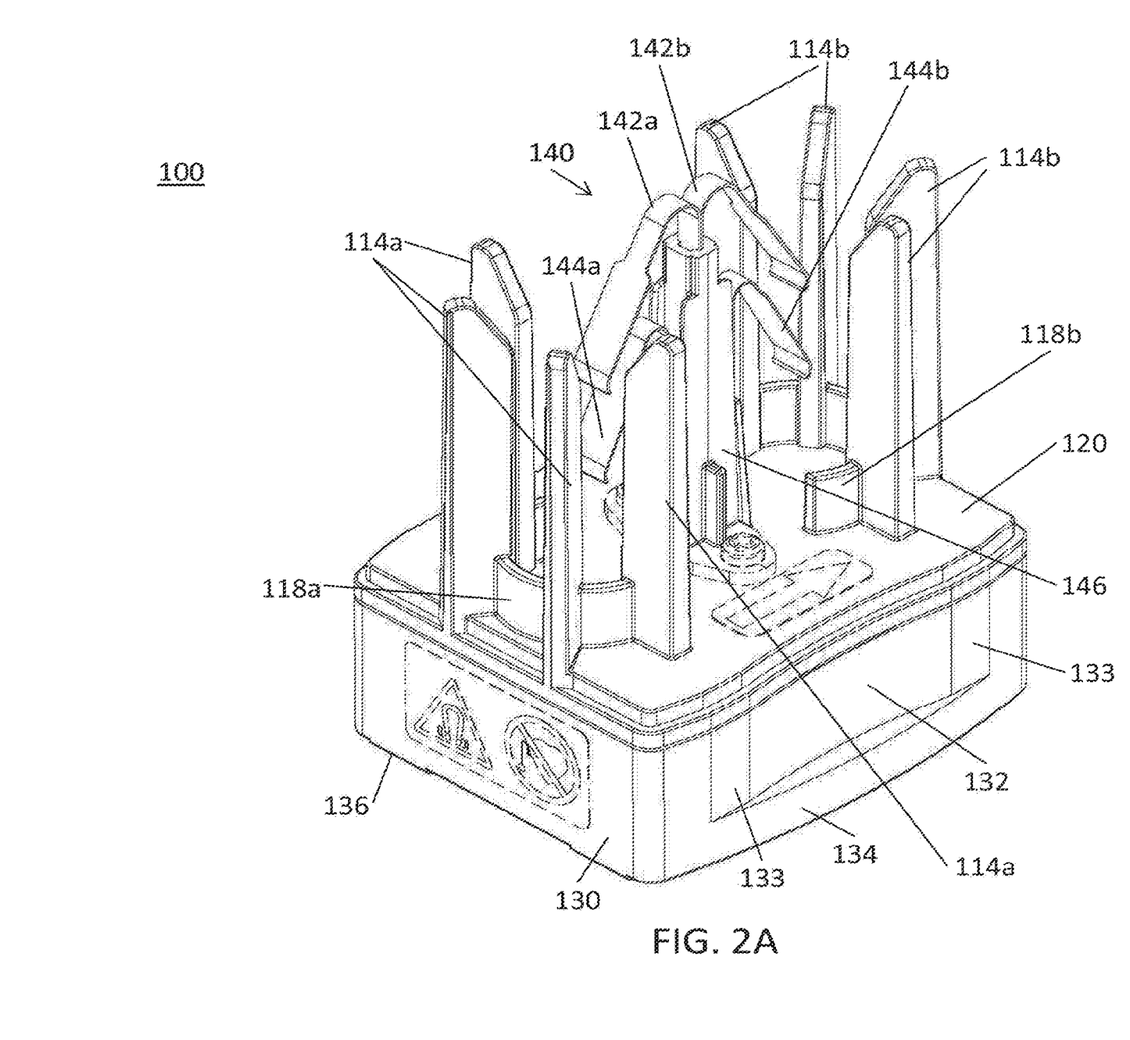
FIG. 2A is a perspective view depicting features of a carrier configured to hold and transport a vessel in an automation system, according to an embodiment.
Figure 3:
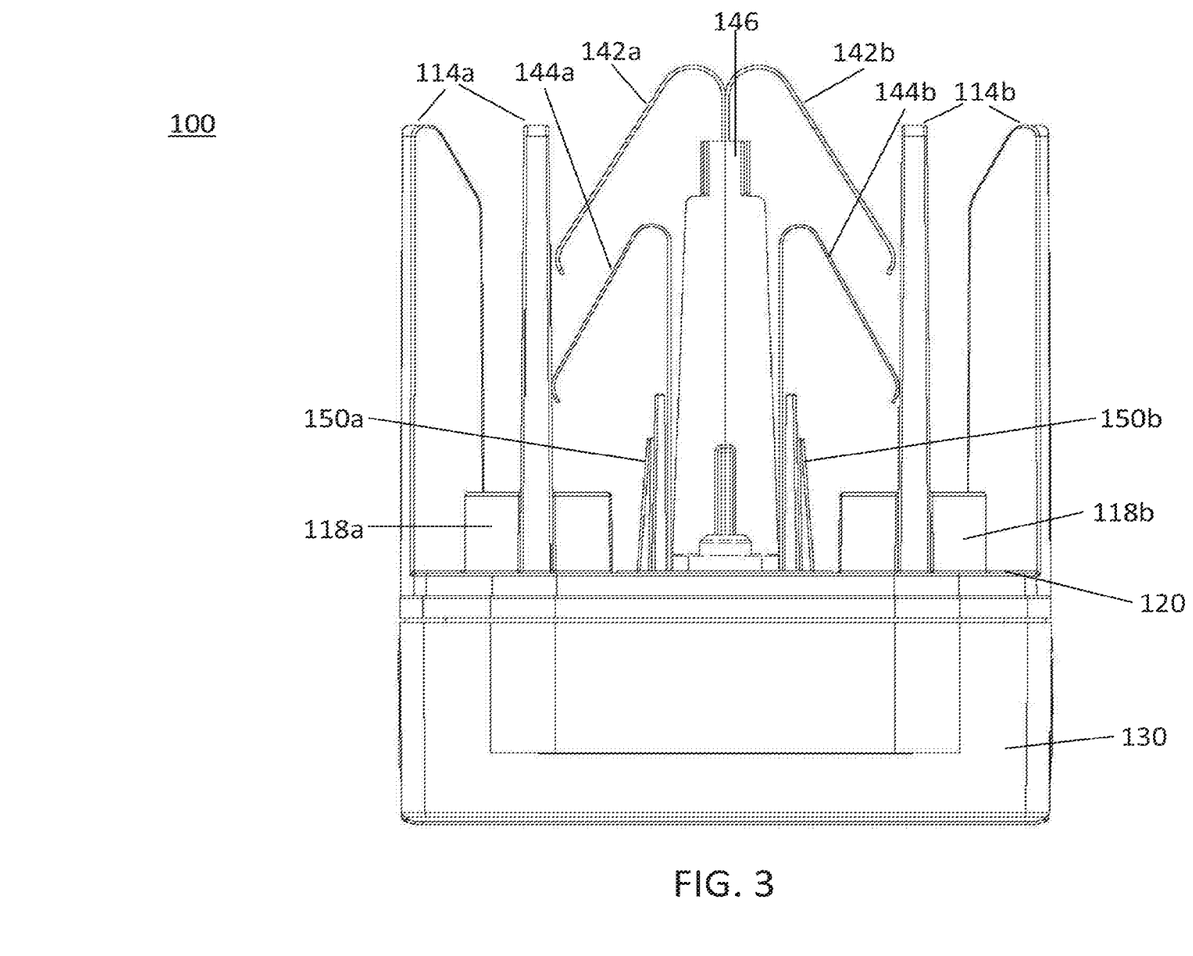
FIG. 3 is a side view diagram depicting features of a carrier configured to hold and transport a vessel in an automation system, according to the embodiment illustrated in FIG. 2A.

With reference to FIG. 2A, a perspective view depicting features of the carrier 100 is provided, according to an embodiment. FIG. 3 is a side view diagram depicting features of the carrier 100, according to the embodiment illustrated in FIG. 2A.

As shown in FIGS. 2A and 3, the spring assembly 140 supported by member 146 includes two sets of leaf springs, one set for each slot 110a, 110b. Upper leaf springs 142a, 142b provide a longitudinal force to push the top of a vessel into tines 114a, 114b (i.e., into the openings 112a, 112b). Meanwhile, lower springs 144a, 144b provide a longitudinal force to push the bottom of the vessel into tines 114a, 114b (i.e., into the openings 112a, 112b). The combination of these two springs 142, 144 ensures vertical alignment of the vessel with respect to the vertical alignment of the tines 114a, 114b.

The two-point vessel retention arranged by the two springs 142, 144 allows sufficient amount of preload with softer springs and optimizes load distribution along the vessel body. The upper spring 142 delivers main preload and is, in an embodiment, made out of thicker steel. The lower spring 144 produces two forces when in contact with a vessel: a lighter force for smaller vessel diameters and higher forces for larger vessel diameters. The centrally located housing spring mount of the spring assembly 140, with back-to-back upper spring arrangement, minimizes carrier footprint and allows better viewing of vessels by peripheral readers.

In an embodiment, a spring shield 150a, 150b is provided to shield or protect the lower spring 144a, 144b from external forces (see FIG. 3). In an embodiment, a molded puck top surface 120 incorporates protective raised barriers (i.e., spring shields 150a, 150b) that protect the lower springs 144a, 144b from external loads. In an embodiment, the molded puck top surface 120 is made out of 30% Carbon Filled Lexan resin to enhance capacitive level sensing.

The springs 142, 144 provide a force to push each vessel into the set of tines 114. The force provided by the springs 142, 144 and the shape of the tines 114 laterally centers each vessel at the longitudinal axis of the carrier 100/tines 114. The arrow on the top surface 120 of FIG. 2A indicates the longitudinal direction of travel of the carrier 100. The tines 114 allow the vessel to be registered at a fixed location in the longitudinal direction such that the center of the vessel will depend on the radius of vessel, but is easily repeatable based on the size of each vessel.

As shown in FIGS. 2A and 3, the tines 114 may comprise a wide chamfer at a top end to provide a wide target for capturing and guiding vessels in position.

Figure 2B:
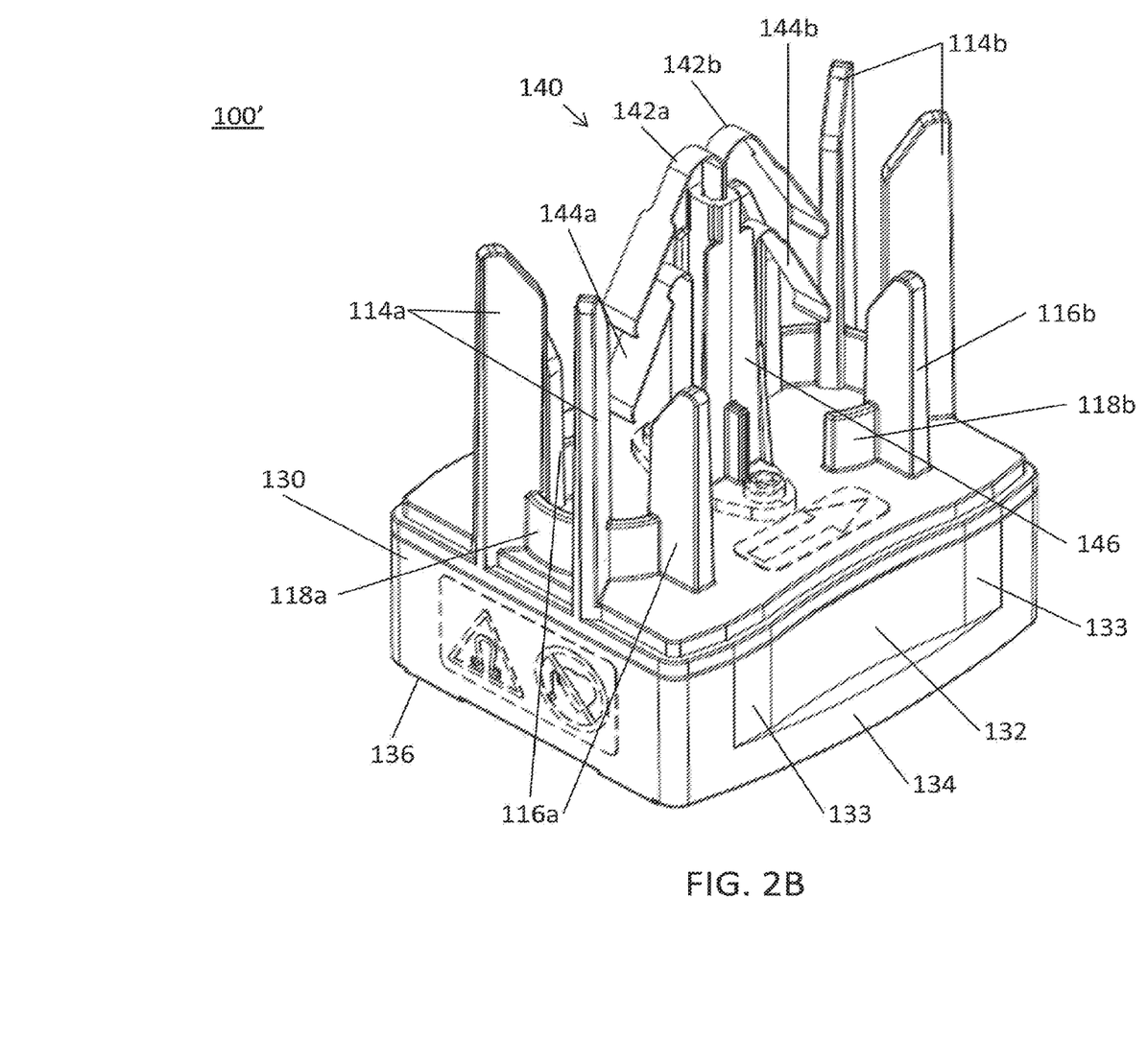
FIG. 2B is a perspective view depicting features of a carrier configured to hold and transport a vessel in an automation system, according to an additional embodiment.

FIG. 2B is a perspective view depicting features of a carrier 100' configured to hold and transport a vessel in an automation system, according to an additional embodiment. The carrier 100' is identical to the carrier 100 except that tines 116a and 116b (the upper-most and lower-most pair of tines for slots 110a and 110b, in the orientation of FIG. 1) are shorter in height than tines 114a and 114b (the right-most and left-most pair of tines for slots 110a and 110b, in the orientation of FIG. 1). This reduced height provides for better visualization of the surface of the vessel container in either the slot 110a and 110b, which may be beneficial for various applications and/or environments, such as for example for use in characterization of vessels and vessel contents using various light sources and/or cameras. The reduced height of the tines 116a, 116b of the carrier 100' still provides for sufficient security of a vessel held thereon. In an embodiment, the reduced-height tines 116a, 116b are 20 mm in height, while the tines 114a, 114b are 50 mm. Other heights and ratios of heights may of course be used depending on the intended application and environment. Moreover, in an embodiment, additional or fewer tines 114, 116 may be provided, with one or more being higher in height than the other tines; or with one or more being of a lower height than the other tines (e.g., six total tines, with four having a reduced-height).

In an embodiment, a metal conductor is added along the height of one or more carrier components (e.g., along one or more of the tines 114, 116) to enhance capacitive level sensing during pipetting operations. In some embodiments, the tines 114, 116 may comprise a metal-impregnated or carbon-impregnated plastic. Thus, these tines 114, 116 can be slightly conductive. The conductivity of tines 114, 116 can facilitate location sensing by a pipette and can affect level sensing of fluids using a capacitive level sense. For example, in an exemplary embodiment, the tines or other structures at the top of the carrier 100, 100' are made out of approximately 30% (25 to 35%) carbon-filled Lexan resin to enhance capacitive level sensing during sample aspiration. In some embodiments, a range between 20% and 50% carbon-filled Lexan resin can be used.

In an embodiment, a patch of material with a known reflectance (e.g., a stray light sensing patch) may be incorporated on one or more of the tines 114, 116. For example, a patch may be placed or integrated along a length of an outer surface of a tine 114, 116 positioned towards a light source and/or a camera.

According to an embodiment, the carrier 100, 100' provided herein is designed to handle approved vessels. In an embodiment, an approved vessel has an outer diameter of 12 mm to 17 mm and a height of 65 mm to 100 mm; is generally cylindrical in shape and may be tapered; and is comprised of glass, plastic, or other materials suitable to the environment in which the vessel is being used. In an embodiment, sizes and orientations of the components of the carrier are adjusted to accommodate properties of the vessel.

Figure 4:
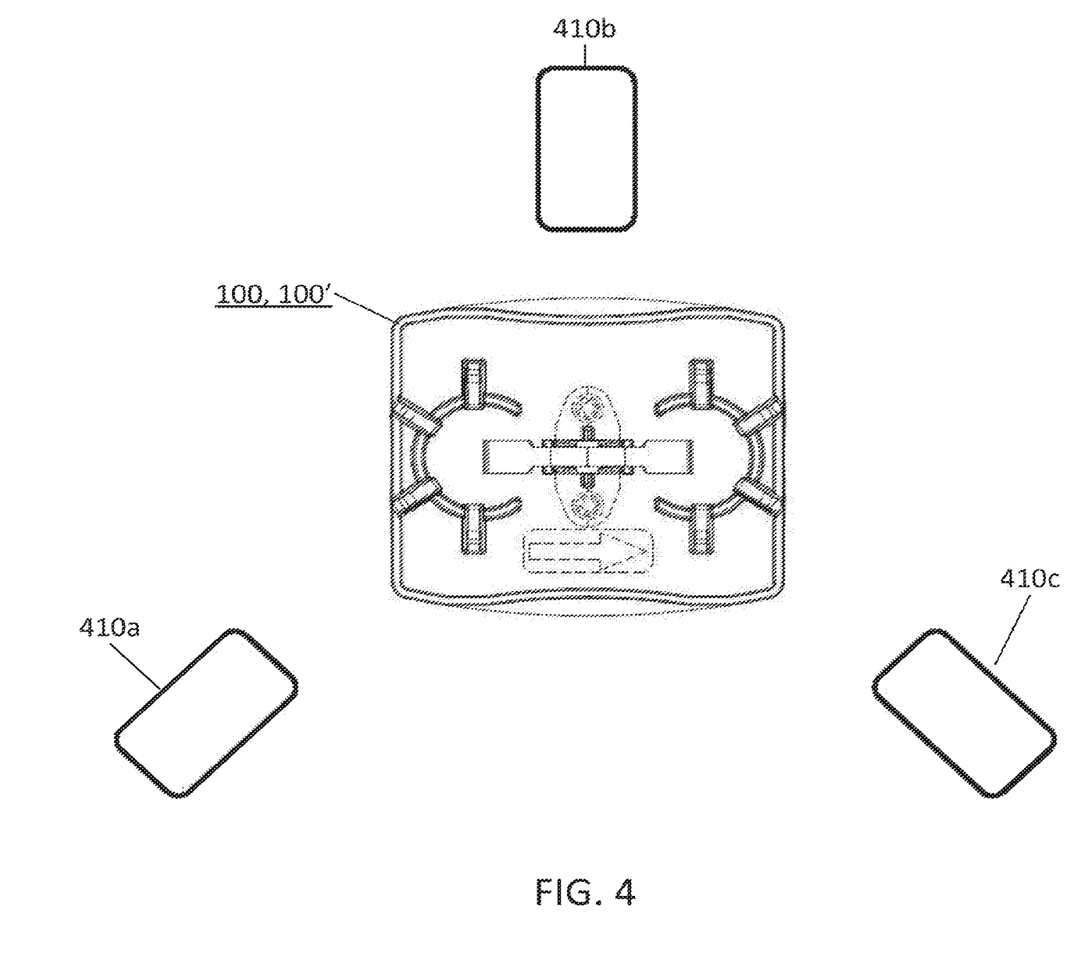
FIG. 4 is a diagram of carrier configured to hold and transport a vessel containing a barcode label and of peripheral devices in an automation system, according to an embodiment.

FIG. 4 is a diagram of carrier 100, 100' configured to hold and transport a vessel containing a barcode label and of peripheral devices 410a, 410b, 410c in an automation system, according to an embodiment. The peripheral devices 410a, 410b, 410c may be any device known by one of ordinary skill in the art to scan and read barcode labels, such as a barcode reader. While three peripheral devices 410a, 410b, 410c are shown in FIG. 4, any number suitable to obtain access to a barcode label on a vessel contained in the carrier 100, 100' may be used.

The carrier 100, 100' according to embodiments provided herein allows for 360° viewing of the vessel through spaces between the tines 114, 116 and components of the spring assembly 140 by a plurality of peripheral devices (e.g., barcode readers), such as the devices 410a, 410b, 410c shown in FIG. 4. According to embodiments provided herein, traditional vessel identification is improved by allowing a vessel to be loaded onto an IVD device with an arbitrary orientation, without the need for an electromechanical component to rotate the vessel in front of a barcode reader. Since the readers 410a, 410b, 410c can inspect the entire outer surface of a vessel, the readers 410a, 410b, 410c are able to read the barcode of a stationary vessel regardless of its orientation. This improves operator workflow, reduces device complexity and cost, and increases reliability.

Figure 5:
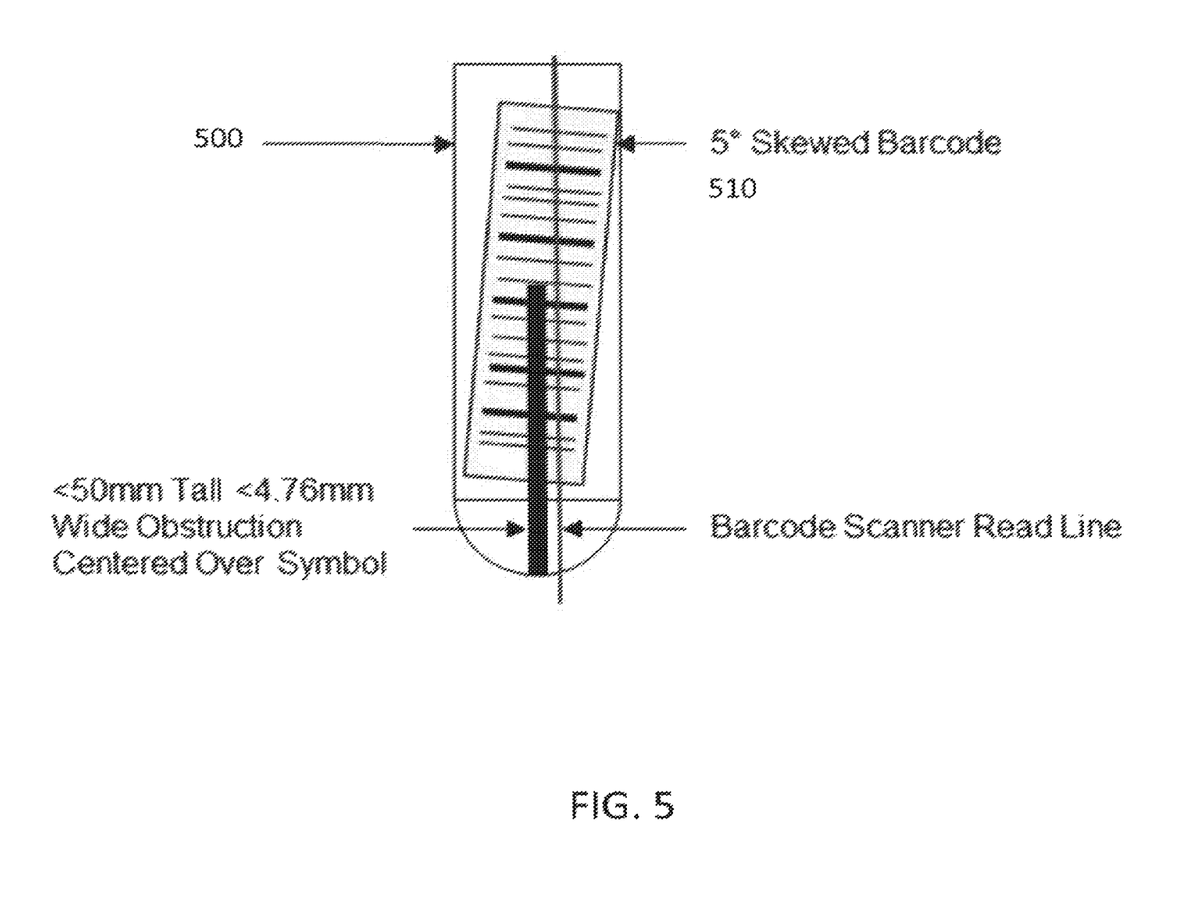
FIG. 5 is a side view of a vessel containing a barcode label, as may be used with embodiments described herein.
Figure 6:
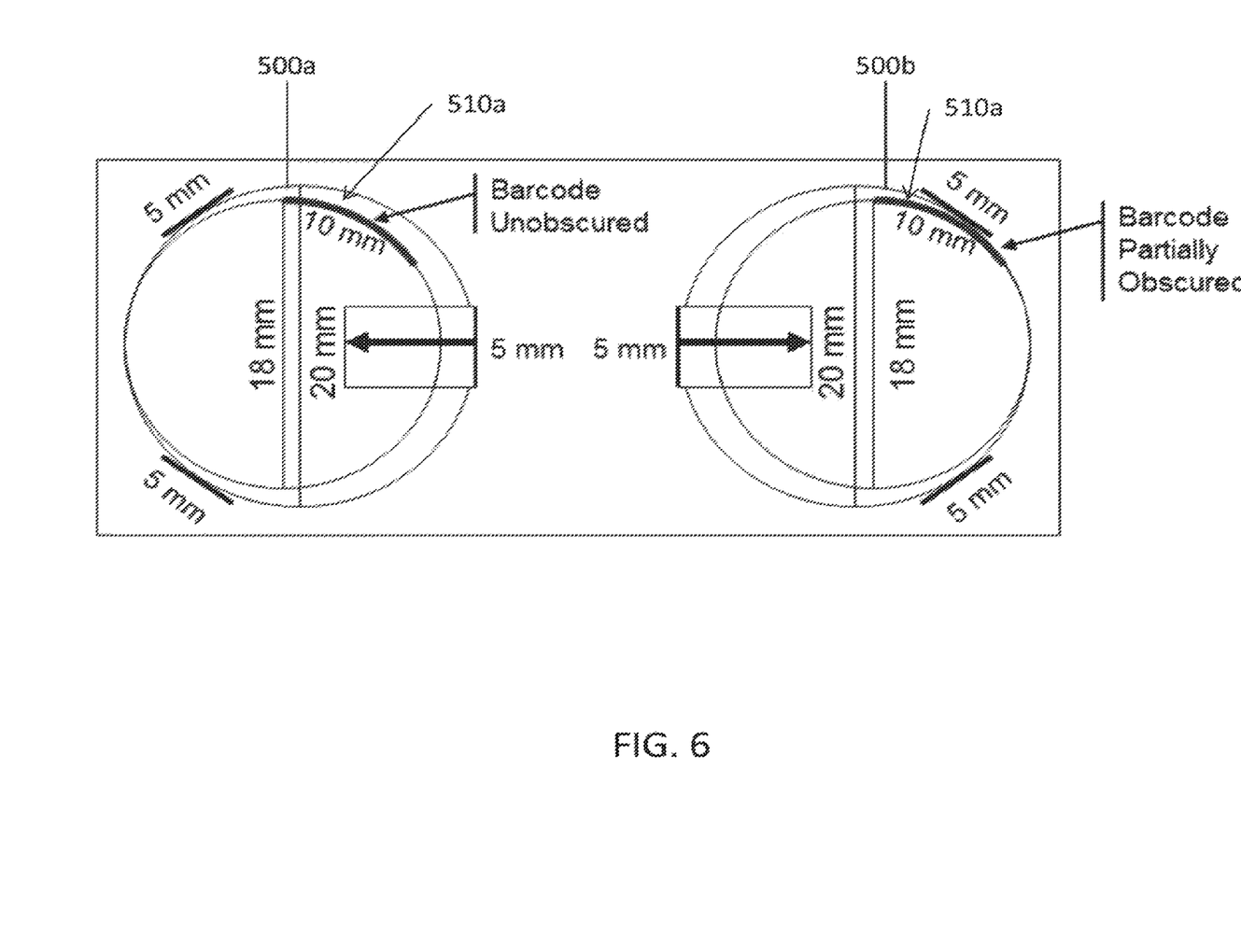
FIG. 6 is a top-down diagram of a portion of a carrier containing vessels with barcode labels, as may be used with embodiments herein.

FIG. 5 is a side view of a vessel 500 containing a barcode label 510, as may be used with embodiments described herein. FIG. 6 is a top-down diagram of a portion of a carrier containing vessels 500a, 500b with barcode labels 510a, 510b, as may be used with embodiments herein. According to an embodiment, the vessel is stabilized, while still allowing for 360° barcode reading, by limiting the size of any mechanical support structures to 4.76 mm wide by 50 mm tall (see FIG. 5 and design considerations below). The mechanical obstructions are also, in an embodiment, aligned with the line of sight of the readers when possible to minimize a "shadow" cast by the obstruction on the symbol surface. Embodiments allow for support structures/obstructions that are larger than 4.76 mm×50 mm, or for labels with a skew greater than the Clinical Laboratory and Standards Institute (CLSI) spec of 5°, by implementing a mirrored dual slot design (see FIG. 6). The negative (unobstructed) space for each slot is complementary such that a completely unobstructed view of the vessel/symbol surface can be constructed by imaging the same vessel in both slots (one after another) and fusing the resulting data. As the support structures are made larger, an increasing percentage of vessels would need to be imaged in both slots. This percentage can be calculated, and an amortized time penalty can be computed for the overhead of moving the vessel to the second slot and reimaging it. As long as the system can handle the extra variation in processing times for individual vessels, the overall system throughput is minimally impacted. This allows for more robust support structures and allows the system to process barcode labels that are not CLSI compliant.

Design inputs for the carrier 100, 100' disclosed herein include: the CLSI specification states that a barcode symbol shall be at least 10 mm wide; the CLSI specification allows a barcode label to be applied with a 5° skew; the CLSI specification prohibits the barcode symbol from appearing on the bottom 20 mm of a vessel; the highest center of mass (CoM) of any supported vessel is <50 mm from the bottom of the vessel; and the vessel will be most stable if control surfaces are applied from three directions and above and below the CoM. Design reasoning for the carrier 100, 100' disclosed herein includes: the posts that form the V-brace and the spring itself may obscure a portion of a vessel's barcode; if the V-brace and spring are 50 mm tall, then 30 mm of the symbol can be obscured (50−20=30); if 30 mm of the symbol length is skewed 5°, 2.62 mm of the symbol width must be visible to read it; and if the symbol is 10 mm wide and 2.62 mm must be visible, a 4.76 mm obstruction can be tolerated.

Based on the design inputs and the design reasoning, the design outputs, according to an embodiment, are that all potentially obscuring mechanical features (i.e., the components of the carrier 100, 100', such as the tines 114a, 114b, 116a, 116b) shall be less than −5 mm wide and 50 mm tall (see FIG. 5). The CLSI standard states that a barcode symbol shall be at least 10 mm wide. All potentially obscuring mechanical features shall be less than 5 mm wide, thus ensuring line of sight for CLSI-compliant barcodes. In order to support non-CLSI-compliant barcodes, the two slots 110a, 110b on the carrier 100, 100' have, according to an embodiment, mirror-image mechanical features. Thus, there is no portion of the vessel's surface that is obscured by both orientations of the mechanical features. Therefore, non-CLSI-compliant barcodes can always be read by placing the vessel in both slots and using the images from the non-obscuring slot (see FIG. 6).

Figure 7:
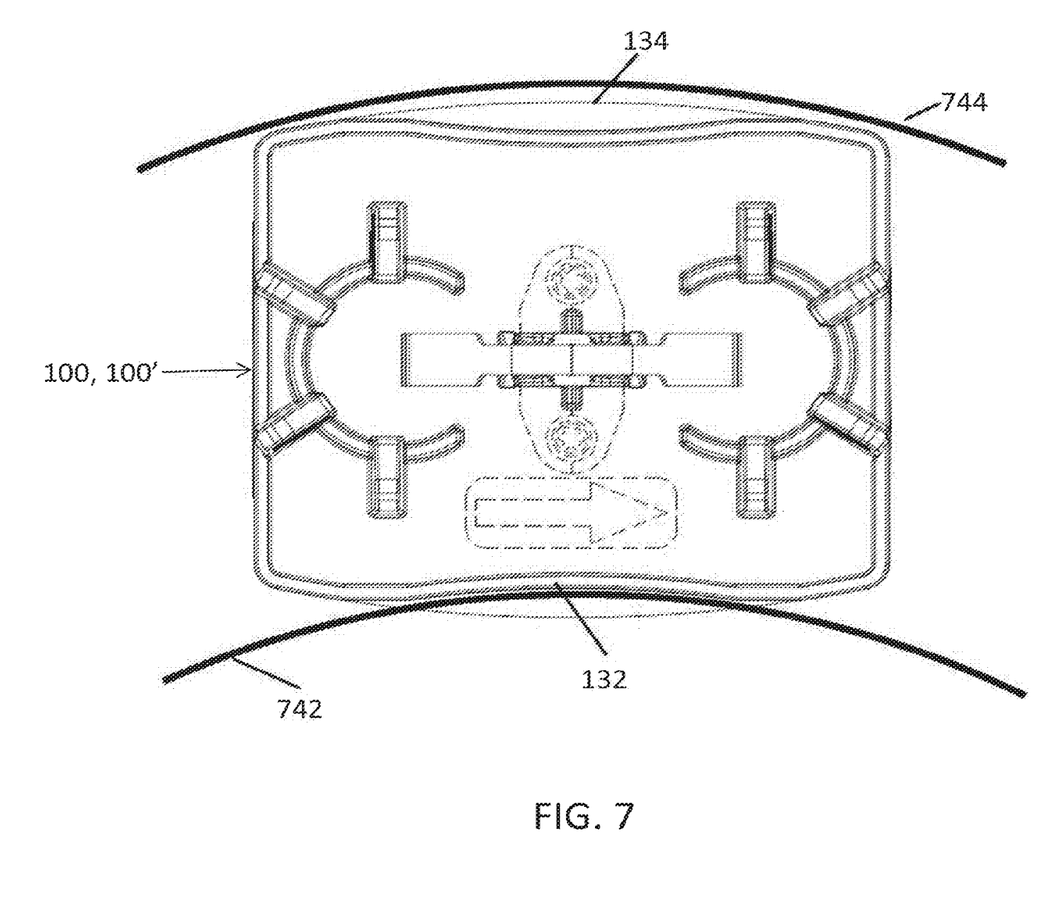
FIG. 7 is a top-down diagram illustrating rail engagement of a carrier and side rails of a curved track section, according to an embodiment.
Figure 8:
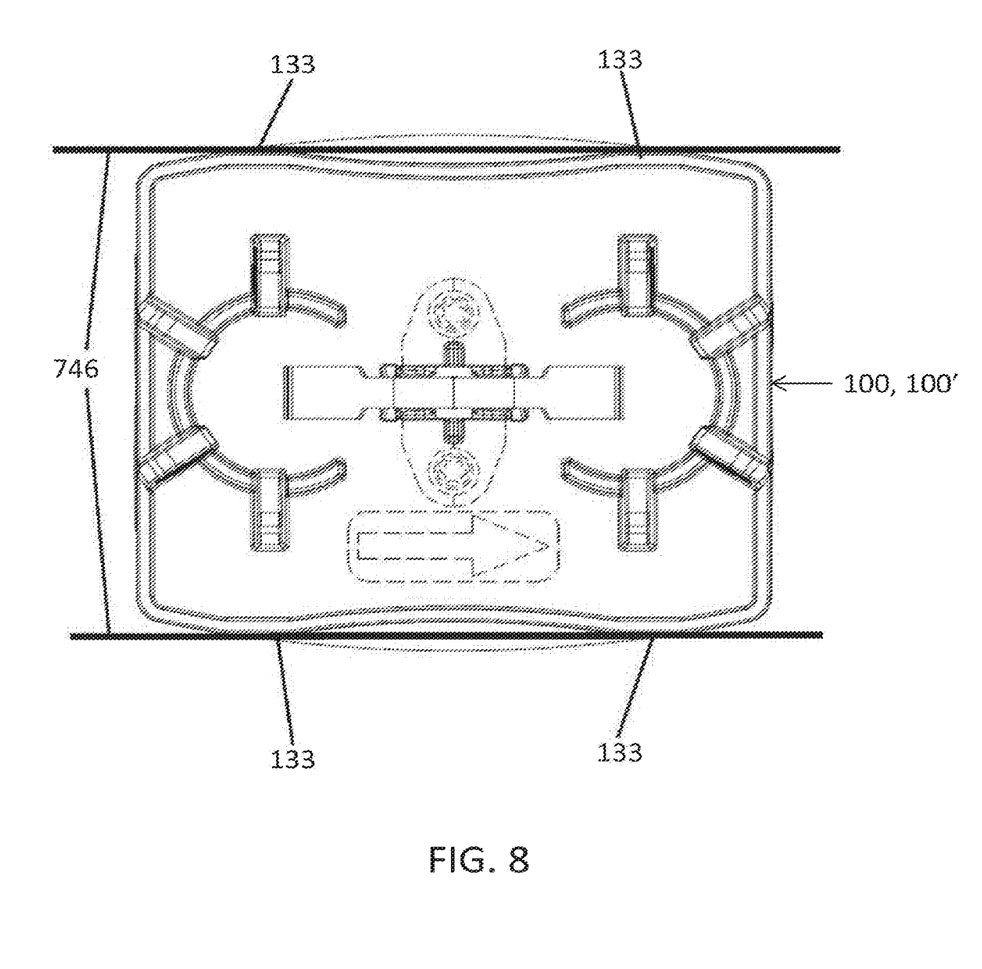
FIG. 8 is a top-down diagram illustrating rail engagement of a carrier and side rails of a straight track section, according to an embodiment.

FIG. 7 is a top-down diagram illustrating rail engagement of a carrier 100, 100' and side rails of a curved track section, according to an embodiment, and FIG. 8 is a top-down diagram illustrating rail engagement of a carrier 100, 100' and side rails of a straight track section, according to an embodiment.

As previously noted, supporting the top plate or surface 120 having the slots 110a, 110b is body 130. The body 130 acts as a housing that may include any onboard circuitry, such as RFID tags, as well as drive magnets and other components. The sidewalls of body 130 can be adapted to interface track rails. For example, to facilitate alignment during movement in straightaways and around fixed radius curves, the sidewalls of the body 130 may have the following exemplary features. An upper portion of a sidewall of body 130 includes a concave section 132 (see FIG. 2A). This concave section 132 can interface the inside corner of a curve 742, as shown in FIG. 7. Meanwhile, at the vertical edges of concave section 132, short flat sections 133 exist in the sidewall (see FIG. 2A). Moving along a straightaway, a pair of sections 133 on each side of the carrier 100, 100' can help align the carrier 100, 100' along a pair of straight rails 746, as shown in FIG. 8. Beneath concave section 132, a convex section 134 (see FIG. 2A) provides an interface that can be used to interact with rails on the outside of a curve 744, as shown in FIG. 7. It will be appreciated, therefore, that the rails in a curved section can have two heights: the rail on the inside of the curve being placed in a higher location to engage concave section 132, while the rail on the outside of the curve is placed in a lower location to engage convex section 134. In some embodiments, this relationship is switched, providing a concave section lower in the body, while the convex section is located higher in the body to increase lateral stability when going around curves. The exemplary relationship of concave, flat, and convex portions of the sidewalls 132, 133, and 134 is also illustrated with reference to the top-down view of FIG. 1.

FIG. 7 illustrates rail engagement between the sidewalls of the carrier 100, 100' and the side rails of a curved track section. In this example, the track has an inner side rail 742 and an outer side rail 744. The inner side rail 742 is configured to interface concave section 132 in the sidewall of the carrier 100, 100'. Side rail 742 does not extend all the way to the track surface, allowing the corresponding convex section below concave section 132 to freely pass underneath side rail 742. Meanwhile, outer track section sidewall 744 engages convex section 134 and extends substantially all the way to the track surface. This allows alignment of the carrier 100, 100' in the curve, by providing physical interfaces to guide rails with radiuses substantially the same as those of the guide rails. This minimizes rattling, oscillations, lateral impacts, etc. when going around a curve.

FIG. 8 illustrates rail engagement between the sidewalls of the carrier 100, 100' and the side rails of a straight track section. In this example, flat sidewall sections 133 engage the parallel, flat sidewalls 746 of the track section. This provides four points of interaction between the carrier 100, 100' and sidewalls, assisting in aligning the carrier 100, 100' in the direction of travel.

At the base of body 130, a one or more longitudinal sliders 136 can be used to minimize friction between the body 130 and a stainless steel track (see FIG. 2A). For example, an ultra-high-molecular-weight (UHMW) or Teflon material may be used.

The method and apparatus provided herein have several advantages. The lower springs 144a, 144b are protected from deformation due to mechanical interferences from tilted vessels out of specification and other unintended handling of the carrier 100, 100'. Pipetting from the vessel transported by the carrier 100, 100' is possible with precision and accuracy. System throughput is supported by vessel mover at modules' pipette stations. Small footprint of the carrier 100, 100' allows five pucks in the queue to support system throughput, according to an embodiment.

According to embodiments provided herein, rotation of the vessel and/or the carrier 100, 100' is not needed. Moreover, orientation of the barcode is arbitrary.

Figure 9A:
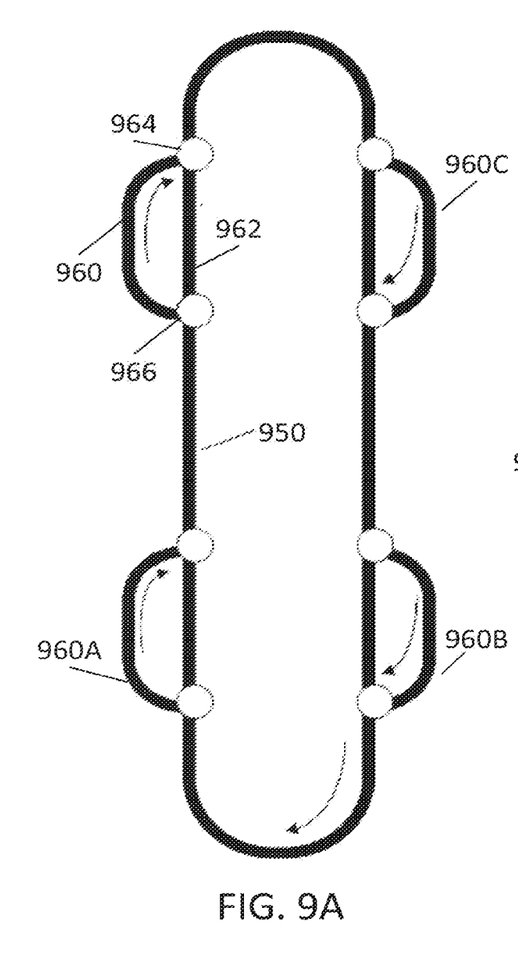
FIGS. 9A and 9B show exemplary track systems that can be adapted for use with embodiments disclosed herein.

FIG. 9A shows one embodiment of a track system that can be adapted for use with embodiments disclosed herein. Track 950 is a rectangular/oval/circular track on which sample carriers move in a clockwise (or counterclockwise) direction. Track 950 may be unidirectional or bidirectional. Carriers can transport any suitable payload with the IVD environment, such as fluid samples, reagents, or waste. Fluids, such as patient samples can be placed in a container or vessel, such as a test tube, vial, cuvette, etc. that can be transported by a carrier. Carrier, as used herein, is a general term for pucks, trays, or the like for handling material in accordance with the disclosed embodiments. Carriers, and by extension payloads, such as sample vessels, can move on the main track 950 or be diverted via decision points such as 964 or 966. These decision points can be mechanical gates or other mechanisms suitable for allowing a sample to be diverted from the main track 950 to a sidecar, such as 960, 960A, 960B, 960C. By way of example, if a sample carrier is traversing the main path 950 and reaches decision point 966, it can be made to continue on the main track to segment 962 or it can be made to divert to sidecar 960.

Figure 9B:
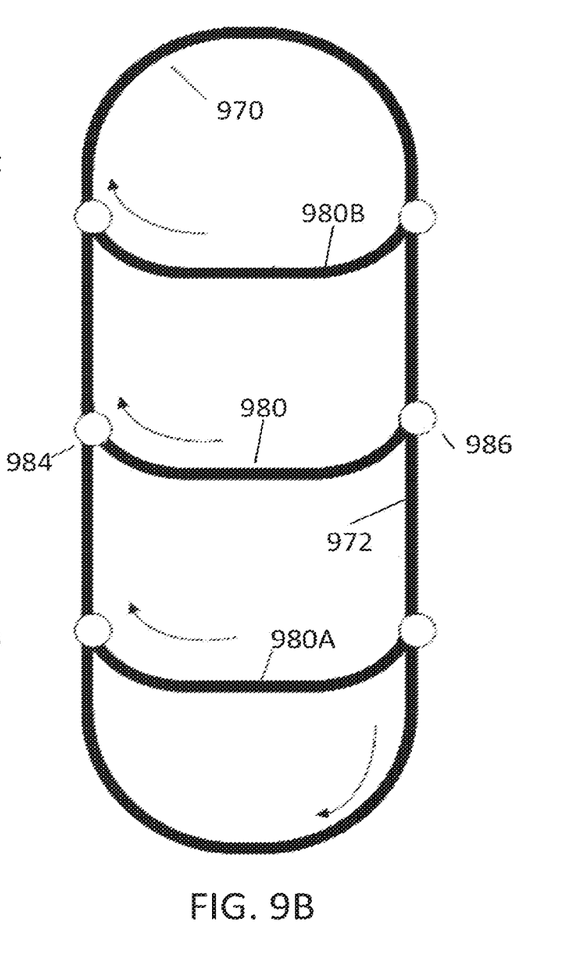

FIG. 9B shows an alternative track layout that may be suitable for certain embodiments of the present invention. Track 970 is also a generally circular track with sample carriers moving clockwise (or counterclockwise). In this example, rather than having sidecars outside of the track, pullouts 980, 980A, and 980B are chords within the track. Similarly, when sample carriers reach decision points, they may be diverted off the main path to a side path such as path 980. At decision point 986, a sample on the main track 170 can be made to continue on the main track or be diverted onto path 980. Once an analyzer station along handling path 980 is done processing the sample, the sample proceeds to decision point 984 where it may be placed back onto the main path 970.

Tracks 950 and 970 are purely exemplary and non-limiting to embodiments described herein.

The systems and processes described herein with respect to the peripheral readers and the processor can be implemented using hardware components, software components, and/or combinations thereof.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. An automation system for use in an in vitro diagnostics (IVD) environment, the automation system comprising:
a carrier configured to hold and transport a vessel containing a barcode label, the carrier comprising:
a body comprising a top surface,
two sets of a plurality of vertically-extending vessel guides on the top surface of the body, each of the two sets of the plurality of vertically-extending vessel guides arranged in a circumferential orientation defining an opening sized and shaped to contain a vessel in the opening, the two sets of a plurality of vertically-extending vessel guides comprising:
two sets of outer vessel guides, and
two sets of inner vessel guides, wherein each of the two sets of inner vessel guides comprises two vessel guides aligned with a center point of the opening and 180° from the other, and wherein one of the two inner vessel guides is 90° from a respective set of outer vessel guides and the other of the two inner vessel guides is 270° from the respective set of outer vessel guides, a spring assembly on the top surface of the body comprising:
a vertically extending housing spring mount having a base connected to the top surface of the body, and
two sets of springs comprising:
a first set of springs comprising at least one spring having a proximal end and a distal end, and
a second set of springs comprising at least one spring having a proximal end and a distal end, wherein the proximal end of each of the at least one spring of the first set of springs and the second set of springs connect to the vertically extending housing spring mount and the distal end of the at least one spring of the first set of springs extends outwardly towards a respective one of the two openings to hold the vessel in a direction opposite that of the distal end of the second set of springs that extends outwardly towards the other of the respective one of the two openings to hold the vessel such that a respective one of the two sets of springs provides support to the vessel contained in a respective one of the two openings to hold the vessel in the respective opening, and wherein the vertically extending housing spring mount is configured to protect the two sets of springs,
wherein the two sets of the plurality of vertically-extending vessel guides and the spring assembly are arranged in a lateral configuration with the spring assembly positioned between the two sets, wherein the two sets of outer vessel guides are each located on an outside portion of a respective opening, wherein the outside portion of a respective opening is a portion of the opening opposite the spring assembly, wherein the two sets of inner vessel guides are each located between the spring assembly and a respective set of outer vessel guides, and wherein the two sets are a mirrored-configuration with respect to one another such that substantially all of an outer surface of the vessel is unobscured when the vessel is contained in, one at a time, each of the two openings;
a track comprising a surface on which the carrier is held and moves;
a plurality of peripheral readers arranged proximate the track at a loading point of the vessel in the carrier, the plurality of peripheral readers configured to read the barcode label on the vessel in the carrier; and
a processor coupled to and in communication with the plurality of peripheral readers, the processor configured to receive and process signals related to the read barcode label on the vessel in the carrier.

2. The system of claim 1, wherein each of the two sets of springs of the spring assembly comprises a dual spring arrangement comprising an upper spring and a lower spring.

3. The system of claim 2, wherein the upper spring is thicker than the lower spring and is configured to deliver a main preload to the vessel.

4. The system of claim 2, wherein the lower spring produces a smaller force for a first vessel with a diameter smaller than a second vessel, wherein the lower spring produces a higher force for the second vessel.

5. The system of claim 2, further comprising a spring shield configured to protect the lower spring from external forces.

6. The system of claim 1, wherein the two sets of the plurality of vertically-extending vessel guides and the spring assembly are aligned with a line of sight of the plurality of peripheral readers.

7. The system of claim 1, wherein an unobstructed space for each opening is complementary such that an unobstructed view of the vessel is constructed by imaging the vessel in both openings by the plurality of peripheral readers and fusing resulting data by the processor.

8. The system of claim 1, wherein the carrier further comprises a plurality of base guides on the top surface of the body, a respective base guide defining a portion of a circumference of a respective opening and are united with a bottom portion of a respective set of the plurality of vertically-extending vessel guides.

9. The system of claim 1, wherein in each of the two sets of a plurality of vertically-extending vessel guides, one or more of the plurality of vertically-extending vessel guides differs in height from others of the plurality of vertically-extending vessel guides.

10. A carrier configured to hold and transport a vessel containing a barcode label in an automation system for use in an in vitro diagnostics (IVD) environment having a plurality of peripheral readers arranged proximate a track at a loading point of the vessel in the carrier, the plurality of peripheral readers configured to read the barcode label on the vessel in the carrier; and a processor coupled to and in communication with the plurality of peripheral readers, the processor configured to receive and process signals related to the read barcode label on the vessel in the carrier, the carrier comprising:

a body comprising a top surface;

two sets of a plurality of vertically-extending vessel guides on the top surface of the body, each of the two sets of the plurality of vertically-extending vessel guides arranged in a circumferential orientation defining an opening sized and shaped to contain a vessel in the opening, the two sets of a plurality of vertically-extending vessel guides comprising:

two sets of outer vessel guides, and two sets of inner vessel guides, wherein each of the two sets of inner vessel guides comprises two vessel guides aligned with a center point of the opening and 180° from the other, and wherein one of the two inner vessel guides is 90° from a respective set of outer vessel guides and the other of the two inner vessel guides is 270° from the respective set of outer vessel guides, a spring assembly on the top surface of the body comprising:

a vertically extending housing spring mount having a base connected to the top surface of the body, and two sets of springs comprising:

a first set of springs comprising at least one spring having a proximal end and a distal end, and a second set of springs comprising at least one spring having a proximal end and a distal end, wherein the proximal end of each of the at least one spring of the first set of springs and the second set of springs connect to the vertically extending housing spring mount and the distal end of the at least one spring of the first set of springs extends outwardly towards a respective one of the two openings to hold the vessel in a direction opposite that of the distal end of the second set of springs that extends outwardly towards the other of the respective one of the two openings to hold the vessel such that a respective one of the two sets of springs provides support to the vessel contained in a respective one of the two openings to hold the vessel in the respective opening, and wherein the vertically extending housing spring mount is configured to protect the two sets of springs, wherein the two sets of the plurality of vertically-extending vessel guides and the spring assembly are arranged in a lateral configuration with the spring assembly positioned between the two sets, wherein the two sets of outer vessel guides are each located on an outside portion of a respective opening, wherein the outside portion of a respective opening is a portion of the opening opposite the spring assembly, wherein the two sets of inner vessel guides are each located between the spring assembly and a respective set of outer vessel guides, and wherein the two sets are a mirrored-configuration with respect to one another such that substantially all of an outer surface of the vessel is unobscured when the vessel is contained in, one at a time, each of the two openings.

11. The carrier of claim 10, wherein the carrier is configured to be held and moved on a track.

12. The carrier of claim 10, wherein an unobstructed space for each opening is complementary such that an unobstructed view of the vessel is constructed by imaging the vessel in both openings by the plurality of peripheral readers and fusing resulting data by the processor.

13. The carrier of claim 10, wherein the two sets of the plurality of vertically-extending vessel guides and the spring assembly are aligned with a line of sight of the plurality of peripheral readers.

14. The carrier of claim 10, wherein each of the two sets of springs of the spring assembly comprises a dual spring arrangement comprising an upper spring and a lower spring.

15. The carrier of claim 14, wherein the upper spring is thicker than the lower spring and is configured to deliver a main preload to the vessel.

16. The carrier of claim 14, wherein the lower spring produces a smaller force for a first vessel with a diameter smaller than a second vessel, wherein the lower spring produces a higher force for the second vessel.

17. The carrier of claim 14, further comprising a spring shield configured to protect the lower spring from external forces.

18. The carrier of claim 10, wherein the plurality of base guides on the top surface of the body are united with a bottom portion of a respective set of the plurality of vertically-extending vessel guides.

19. The carrier of claim 10, wherein in each of the two sets of a plurality of vertically-extending vessel guides, one or more of the plurality of vertically-extending vessel guides differs in height from others of the plurality of vertically-extending vessel guides.

* * * * *